US011551424B2

(12) United States Patent
Soon-Shiong (10) Patent No.: US 11,551,424 B2
(45) Date of Patent: Jan. 10, 2023

(54) INTERACTION ANALYSIS SYSTEMS AND METHODS (71) Applicant: Nant Holdings IP, LLC, Culver City, CA (US)

(72) Inventor: Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 16/914,242

(22) Filed: Jun. 26, 2020

(65) Prior Publication Data
US 2020/0327739 A1 Oct. 15, 2020

Related U.S. Application Data (63) Continuation of application No. 16/119,857, filed on Aug. 31, 2018, now Pat. No. 10,699,487, which is a continuation of application No. 15/648,411, filed on Jul. 12, 2017, now Pat. No. 10,068,384, which is a continuation of application No. 13/709,618, filed on Dec. 10, 2012, now Pat. No. 9,728,008.

(51) Int. Cl.
*G06T 19/00* (2011.01)
*G06T 7/00* (2017.01)
*G06F 3/00* (2006.01)
*G06F 3/0481* (2022.01)

(52) U.S. Cl.
CPC ............ *G06T 19/006* (2013.01); *G06F 3/002* (2013.01); *G06F 3/0481* (2013.01); *G06T 7/00* (2013.01)

(58) Field of Classification Search
None
See application file for complete search history.

(56) References Cited

U.S. PATENT DOCUMENTS 6,711,293 B1  3/2004  Lowe
7,016,532 B2  3/2006  Boncyk et al.
(Continued)

FOREIGN PATENT DOCUMENTS

KR  2012-0019153  3/2012

OTHER PUBLICATIONS

Lowe, "Object Recognition from Local Scale-Invariant Features," Proc. of the International Conference on Computer Vision, Corfu, Sep. 1999, 8 pages.
(Continued)

*Primary Examiner* — William L Bashore
*Assistant Examiner* — Nathan K Shrewsbury
(74) *Attorney, Agent, or Firm* — Mauriel Kapouytian Woods LLP; Elaine K. Lee; Andrew A. Noble (57) ABSTRACT

Interaction-based ecosystems are presented. Interaction analysis engine analyze media content to derive a set of media features. The engine can then identify one or more interaction objects (e.g., transactions, searches, game play, etc.) based on the set of media features. Relevant interaction objects can then be instantiated as persistent available or active points of interaction readily accessed by a consumer. The consumer need only capture a digital representation of the content via a user device, a smart phone for example. A second set of media features can be derived from the digital representation and the second set of media features can then be used to find the instantiated interactions.

36 Claims, 4 Drawing Sheets

(56) References Cited

U.S. PATENT DOCUMENTS

| | | | |
|---|---|---|---|
| 7,775,437 B2 | 8/2010 | Cohen | |
| 7,899,252 B2 | 3/2011 | Boncyk et al. | |
| 7,953,219 B2 | 5/2011 | Freedman et al. | |
| 8,224,077 B2 | 7/2012 | Boncyk et al. | |
| 8,224,078 B2 | 7/2012 | Boncyk et al. | |
| 8,683,386 B2* | 3/2014 | Shuster | A63F 13/12 715/848 |
| 8,810,598 B2* | 8/2014 | Soon-Shiong | A63F 13/21 345/632 |
| 9,728,008 B2 | 8/2017 | Soon-Shiong | |
| 10,068,384 B2 | 9/2018 | Soon-Shiong | |
| 10,699,487 B2 | 6/2020 | Soon-Shiong | |
| 2004/0002937 A1* | 1/2004 | Jones | G06F 16/986 707/E17.118 |
| 2004/0205715 A1 | 10/2004 | Taylor | |
| 2005/0175970 A1* | 8/2005 | Dunlap | G09B 5/06 434/169 |
| 2006/0041891 A1* | 2/2006 | Aaron | G09B 7/00 719/315 |
| 2006/0047704 A1* | 3/2006 | Gopalakrishnan | G06F 16/51 707/E17.031 |
| 2006/0059033 A1 | 3/2006 | Wagner | |
| 2006/0190812 A1* | 8/2006 | Ellenby | G06F 16/5854 707/E17.112 |
| 2007/0191111 A1* | 8/2007 | Sylla | G07F 17/3237 463/43 |
| 2007/0226751 A1* | 9/2007 | Brendle | G06F 9/547 719/313 |
| 2008/0070689 A1* | 3/2008 | Van Luchene | G07F 17/32 463/42 |
| 2008/0070690 A1* | 3/2008 | Van Luchene | A63F 13/12 463/42 |
| 2008/0081701 A1* | 4/2008 | Shuster | A63F 13/35 463/42 |
| 2008/0177793 A1 | 7/2008 | Epstein et al. | |
| 2008/0200253 A1* | 8/2008 | Van Luchene | G07F 17/3232 463/42 |
| 2008/0207327 A1* | 8/2008 | Van Luchene | A63F 13/85 463/42 |
| 2008/0214262 A1* | 9/2008 | Phillips | G07F 17/3262 463/16 |
| 2009/0013052 A1* | 1/2009 | Robarts | G06Q 10/107 709/206 |
| 2009/0017886 A1* | 1/2009 | McGucken | A63F 13/005 463/1 |
| 2009/0238460 A1 | 9/2009 | Funayama et al. | |
| 2009/0291755 A1* | 11/2009 | Walker | G07F 17/3262 463/29 |
| 2010/0017722 A1* | 1/2010 | Cohen | A63F 13/25 715/740 |
| 2010/0023878 A1* | 1/2010 | Douris | G06F 3/0481 715/757 |
| 2010/0063892 A1* | 3/2010 | Keronen | G06Q 30/04 705/26.1 |
| 2010/0070276 A1 | 3/2010 | Wasserblat et al. | |
| 2010/0177194 A1* | 7/2010 | Huang | G06T 7/277 348/157 |
| 2010/0177969 A1 | 7/2010 | Huang | |
| 2010/0275267 A1* | 10/2010 | Walker | G06F 3/20 709/206 |
| 2011/0047251 A1 | 2/2011 | Seo | |
| 2011/0053688 A1* | 3/2011 | Crawford | A63D 5/04 463/31 |
| 2011/0078602 A1 | 3/2011 | Gammon et al. | |
| 2011/0206198 A1 | 8/2011 | Freedman et al. | |
| 2011/0244798 A1* | 10/2011 | Daigle | H04L 63/083 455/41.2 |
| 2011/0279445 A1* | 11/2011 | Murphy | G06T 19/006 715/764 |
| 2011/0307257 A1 | 12/2011 | Pereg et al. | |
| 2011/0319148 A1* | 12/2011 | Kinnebrew | G06V 20/42 463/43 |
| 2012/0032977 A1* | 2/2012 | Kim | G06T 19/006 345/633 |
| 2012/0078882 A1* | 3/2012 | Boldyrev | G06F 16/9535 707/722 |
| 2012/0122570 A1* | 5/2012 | Baronoff | A63F 13/792 463/31 |
| 2012/0142428 A1* | 6/2012 | Wilson | A63F 13/79 463/42 |
| 2012/0162255 A1* | 6/2012 | Ganapathy | A63F 13/65 345/633 |
| 2012/0208592 A1* | 8/2012 | Davis | H04W 4/50 705/26.1 |
| 2012/0233032 A1* | 9/2012 | Calman | G06Q 30/0613 709/204 |
| 2012/0244939 A1* | 9/2012 | Braun | A63F 13/213 463/31 |
| 2012/0287122 A1* | 11/2012 | Nadar | G06T 17/00 345/632 |
| 2012/0299961 A1* | 11/2012 | Ramkumar | G06T 19/006 345/632 |
| 2013/0176202 A1* | 7/2013 | Gervautz | G06F 3/04886 345/156 |
| 2013/0178257 A1* | 7/2013 | Langseth | A63F 13/812 463/4 |
| 2013/0222381 A1* | 8/2013 | Di Censo | G06T 19/006 345/419 |
| 2013/0342564 A1* | 12/2013 | Kinnebrew | G09G 3/003 345/619 |
| 2013/0342571 A1* | 12/2013 | Kinnebrew | G06F 3/147 345/633 |
| 2014/0002496 A1* | 1/2014 | Lamb | G06T 19/006 345/633 |
| 2014/0063054 A1* | 3/2014 | Osterhout | G06F 3/005 345/633 |
| 2014/0063055 A1* | 3/2014 | Osterhout | G06F 3/165 345/633 |
| 2014/0081777 A1* | 3/2014 | Mastrodonato | G06Q 50/12 705/15 |
| 2014/0108979 A1* | 4/2014 | Davidson | G06F 3/0488 715/765 |

OTHER PUBLICATIONS

Gionis et al., "Similarity Search in High Dimensions Via Hashing," Proceedings of the 25th VLDB Conference, Sep. 7-10, 1999, pp. 518-529.

Leutenegger et al., "BRISK: Binary Robust Invariant Scalable Keypoints," 2011 IEEE international Conference on Computer Vision (ICCV), Nov. 6-13, 2011, 8 pages.

Google, Inc., "The New Multi-Screen World: Understanding Cross-Platform Consumer Behavior," https://www.thinkwithgoogle.com/_qs/documents/861/au-new-multi-screen-world.pdf, Aug. 2012, 42 pages.

Designboom, "Tesco Virtual Supermarket In a Subway Station," http://www.designboom.com/weblog/cat/16/view/15557/tesco-virtual-supermarket-in-a-subway-station.html, DesignBoom.com, 2 pages.

International Search Report and Written Opinion for International Application No. PCT/US2013/074199 dated Apr. 1, 2014, 8 pages.

Rouse, "What is Instantiation," http://whatis.techtarget.com/definition/instantiation, Techtarget.com, 8 pages.

* cited by examiner

INTERACTION ANALYSIS SYSTEMS AND METHODS

CROSS-REFERENCE TO RELATED APPLICATIONS

This application is a continuation of U.S. application Ser. No. 16/119,857, filed on Aug. 31, 2018, which is a continuation of U.S. application Ser. No. 15/648,411, filed on Jul. 12, 2017, which is a continuation of U.S. application Ser. No. 13/709,618, filed on Dec. 10, 2012. The entire contents of these applications are incorporated herein by reference.

FIELD OF THE INVENTION

The field of the invention is interactive media technologies.

BACKGROUND

Interactive media requires one or more authoring tools that allow formulation of interactive content. For example, U.S. patent application publication 2008/0177793 to Epstein et al. titled "System and Method for Using Known Path in Delivering Enhanced Multimedia Content to Mobile Devices", filed Sep. 20, 2007, describes authoring tools for the creation of mobile media documentaries. However, such an approach is not useful when content providers have no access to such tools or technical ability to utilize complex editing or authoring tools.

Effort has been directed to analyzing interactions as discussed in U.S. Pat. No. 7,953,219 to Freedman et al. titled "Method Apparatus and System for Capturing and Analyzing Interaction Based on Content", filed Jul. 14, 2004. The Freedman approach seeks to provide an analysis of interactions per se, but does not give rise to interactions in the first place. In a similar vein, U.S. patent application 2006/0059033 to Wagner et al. titled "Interaction Object", filed Sep. 2, 2004, indicates that an interaction object can represent a customer content session.

U.S. patent application 2004/0205715 to Taylor titled "Method, System, and Program Generating a User Interface", filed May 9, 2001, describes constructing a user interface based on receiving an interaction object from an application program where the interaction object provides output data to be rendered on an output device. Unfortunately, such an approach is not useful when one desires to interact with media data where the media data lacks a priori defined points for user participation.

Further progress is made by U.S. patent application publication 2010/0177194 to Huang et al. titled "Image Processing System and Method for Object Tracking", filed Jan. 13, 2010. Huang discusses that objects in a video can be tracked so that a person viewing the video can interact with the moving object via IPTV. Unfortunately, the Huang approach also requires use of an authoring tool. The authoring tool is used to instrument the video with metadata (e.g., MPEG-7) allowing suitably adapted devices capable of understanding the metadata to provide interaction services.

Yet another example includes U.S. patent application publication 2011/0047251 to Seo titled "Method and System for Providing Interaction Content Service of Ubiquitous Environment and Computer-Readable Recording Medium", filed Apr. 13, 2009. Seo also contemplates providing modified content to a device capable of providing interaction services.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

The above approaches require complex authoring tools that modify content or dedicated devices capable of providing interaction services based on consumption of the modified content. Although useful in some circumstances, the approaches disclosed fail to provide for scenarios where a user's device (e.g., cell phone, tablet, game console, etc.) can naturally interact with displayed media content. For example, the known art fails to allow a content provider to simply construct interactions based on their raw content without modifying the content.

The applicant has appreciated that the difficulties associated with authoring interactive media content demand complex apparatus, systems or methods that can provide for user interactions to be associated with unaltered, raw media content. Additionally, the applicant has appreciated that the great diversity of available user devices and media players requires a strong coupling between interaction devices and media content via a platform that can openly interact across many devices, players, interfaces or media types without requiring changes to existing media content distribution infrastructure.

Thus, there is still a need for a technology that allows one to create interactive media content without requiring modification of the media itself.

SUMMARY OF THE INVENTION

The inventive subject matter provides apparatus, systems and methods in which one can leverage an interaction analysis engine to create interactive media without requiring modification of the media itself. One aspect of the inventive subject matter comprises an interaction analysis system having an interaction analysis engine coupled with an interaction object database.

Interaction object databases can be configured to store interaction objects, where interaction objects can be considered a form of persistent data objects representing possible interactions that a user can have or experience via one or more electronic devices (e.g., cell phone, tablet, computer, camera, game console, etc.). For example, an interaction object could represent a template for supporting an online transaction, a purchase, a search, a comparison of items, an instance of a game, an issuance of a command, or any other type of interaction. Interaction objects can also include relevancy criteria defined as a function of media features derived from a media stream or content.

An interaction analysis engine can be configured to ingest media content by receiving the media content via one or more media interfaces (e.g., web service, HTTP server, A/V input, etc.). The interaction analysis engine analyzes the media content to identify one or more media features representing characteristics of the media (e.g., scale invariant features, color balance, audio signatures, edge detection, rate of change of features, histograms, etc.). The analysis engine can use the media features, possibly as part of a query structure, to search the interaction object database to find or select one or more interaction objects having relevancy criteria satisfied by the media features. From the set of selected interaction objects, the analysis engine can instantiate an instance of an interaction object where the interaction instance forms a persistent object through which a user's or other device can have an interaction related to the media content. The analysis engine can utilize the interaction instance to configure one or more electronic devices to support a corresponding interaction with a user.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server based interactive media systems, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including converting media features into one or more signals that instruct devices to create persistent interactions. Upon creation, the persistent interaction instances can become available to other devices.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, the terms "coupled to" and "coupled with" are also used euphemistically to reference to communicatively coupling two or more devices over a network, possibly through one or more intermediary device.

Figure 1:
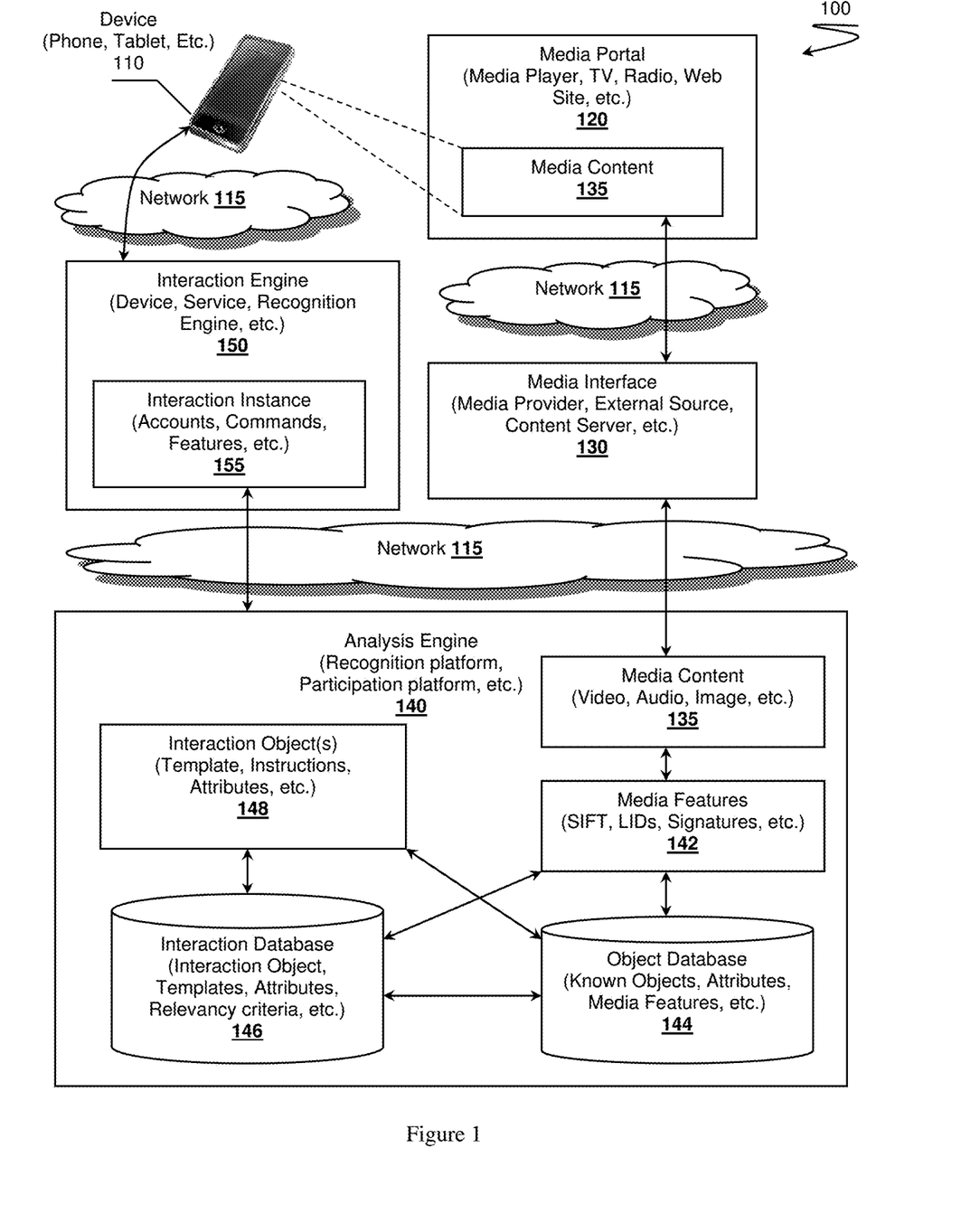
FIG. 1 is a schematic of interaction analysis ecosystem.

In FIG. 1, ecosystem 100 represents an interaction system where users can interact with media content 135 via one or more of persistent interaction instances 155. Such an approach gives rise to a rich set of possible user-media interactions, without significantly impacting a content provider. In ecosystem 100, a content provider can make their media content 135 available to interaction analysis engine 140 or media portal 120 via media interface 130. Media content 135 can comprise raw, or rather natural, data formats as would be typically used to create media content 135 (e.g., MP3, JPG, MPEG4, PNG, OGG, etc.). The disclosed techniques do not require modification of media content 135 to create a rich interaction experience for a user. Thus, media providers are not required to modify their content creation process to create rich interactive content for a user.

Ecosystem 100 can also include interaction database 146 storing one or more interaction objects 148 that represent possible points of interaction that could be made available to devices or users when they observe media content 135. Interaction object 148, in some embodiments, can be considered a template that outlines a possible type of interaction. Further, interaction database 146 can store interaction objects 148 according to an indexing scheme derived from a namespace defined by possible features that can be extracted from media content 135. Thus, analysis engine 140 can extract media features 142 from media content 135 and use media features 142 to search for interaction objects 148 in interaction database 146 that could be considered relevant to media content 135.

Input media content 135 represents a broad spectrum of media formats or modalities. For example, media content 135 can include image data, audio data, video data, kinesthetic data (e.g., force-feedback, texture, Braille, etc.), medical data, game data, opinion data, sentiment data, reasoning data, or other types of modalities. Further, media content 135 can adhere to one or more formats depending on the nature of the content. Media content 135 can include a data stream, a file, a record, a transmission, a packet, a datagram, a broadcast, or other types of presentation. Still further, media content 135 can adhere to one or more standardized formats depending on the nature of the content: MP3, MPEG4, JPG, PNG, MPEG7, H.323, NTS, PAL, or other types of formats.

In the example shown, a content provider utilizes the services offered by interaction analysis engine 140 to identify or instantiate possible points of interactions associated with their media content 135. Analysis engine 140 receives media content 135 via one or more of media interface 130. For example, analysis engine 140 can pull media content 135 from a media provider's web site or other source (e.g., FTP, HTTP server, Dropbox®, feeds, etc.) over network 115 (e.g., WAN, LAN, Internet, cellular network, VPN, wireless, broadcasts, satellite, etc.). In some embodiments, analysis engine 140 can receive media content 135 substantially in real-time via media portal 120. Consider a scenario where a television network is ready to broadcast a sitcom. In one approach, the sitcom content can be a priori sent to analysis engine 140 for analysis before the show airs on television, thus ensuring that possible interaction points are pre-established before airing. In another approach, analysis engine 140 can "watch" the show as it is broadcasted on media portal 120 (e.g., a television channel, radio station, tuner, receiver, web site, etc.) and conduct a substantially real-time analysis of the broadcast show. Thus, interaction points can be established "just-in-time" for the viewership. One aspect of the inventive subject matter is considered to include instantiation of just-in-time interactions for media content 135.

Regardless of how media content 135 is obtained by analysis engine 140, analysis engine 140 analyzes media content 135 to derive one or more of media features 142. Media features 142 can represent algorithmically derived features from the data within media content 135. For example, one or more frames of a video stream can be analyzed to generate one or more Scale-Invariant Feature Transform (SIFT) features (see Lowe, David G. (1999). "Object recognition from local scale-invariant features". Proceedings of the International Conference on Computer Vision. 2. pp. 1150-1157; see also U.S. Pat. No. 6,711,293). One should appreciate that media features 142 can represent characteristics of the media content data rather than the content within media content 135. Additional techniques for deriving media features 142 include techniques based on one or more of Speeded Up Robust Feature (SURF; see U.S. patent application 2009/0238460), Local Image Descriptors (see U.S. Pat. No. 8,224,078), Gradient Location and Orientation Histogram, Local Energy based Shape Histogram, Blob detection, feature detection, or other types of image analysis. Non-visual techniques can be applied to non-visual modalities to derive media features 142; voice activity detection, voice recognition algorithms, speech recognition (e.g., hidden Markov models, dynamic time warping, etc.), or other algorithms.

One should appreciate that the media features 142 can be generated through myriad techniques that are known or yet to be invented. Regardless of how media features 142 are derived, they can then can be used as an indexing scheme to identify objects or symbols within the media content 135. In the example illustrated, interaction database 146 stores interaction objects 148, where interaction database 146 can index interaction objects 148 according to one or more indexing schemes derived from media features 142. The indexing schemes can be based on a direct mapping to interaction objects 148 or an indirect mapping to interaction objects 148.

Interaction database 146 can store interaction objects 148 according to an indexing scheme derived according to a media feature namespace that covers a possible extent of values of media features 142. For example, each interaction object 148 can be indexed according to SIFT feature values. Such an indexing scheme can be multi-indexed where each interaction object 148 can be accessed through different dimensions of the namespace. The dimensions of the namespace can be characterized by algorithm (e.g., SIFT, SURF, etc.), modality (e.g., visual, audio, kinesthetic, etc.), or other dimension. Such an approach is useful to allow analysis engine 140 multiple paths to identify interaction objects 148 that could be considered relevant to media content 135. One should appreciate that the indexing namespace is extensible. As new algorithms for analyzing data modalities or recognizing objects within media content 135 become available, interaction objects 148 can simply be tagged with appropriate media features or classes of media features resulting from the new algorithms. Thus, interaction database 146 can be considered future proof without being locked into one type of media format, analysis algorithm, or media feature set.

In view that the indexing scheme of interaction database 146 can be based on a multi-dimensional namespace, media features 142 can comprise a well-structured set of media features. The set can may be constructed as a vector where each element of the vector represents one of the dimensions of the indexing scheme (e.g., SIFT dimension, audio dimension, etc.). One should appreciate that each element of the set or vector can itself be multi-valued. For example, a SIFT element can include a set of SIFT features derived from media content 135. In other embodiments, the media features 142 can comprise a set of media features structured as an N-tuple of data elements. When appropriate, analysis engine 140 can use the set of media features to search for or select one or more interaction objects 148 in object database 144.

Interaction objects can also be accessed through indirect indexing schemes. In the example, illustrated and discussed further with respect to FIG. 3, media features 142 can be used to recognize or otherwise identify intermediary entities where the intermediary entities map or point to relevant interaction objects 148. In some embodiments, ecosystem 100 can include one or more of object database 144 storing information related to known objects. The known object information can include media features related to the known object. For example, object database 144 can store SIFT features related to a toy action figure, item of clothing, a purchasable object, or other object where the SIFT features are derived from images of the action figure, possibly from different views. In such an embodiment, analysis engine 140 can use media features 142 to query object database 144 and retrieve object information related to one or more "recognized objects". The object information can include pointers to relevant interaction objects 148 within interaction database 146. Such an approach provides for bridging between recognized content within media content 135 and possible interactions.

Acceptable techniques that can be adapted for identifying intermediary content features or intermediary entities include those disclosed in U.S. Pat. Nos. 7,016,532; 7,899,252; 8,224,077; and 8,224,078; or those disclosed in U.S. patent application publication 2010/017719 to Huang et al. titled "Image Processing System and Method for Object Tracking", filed Jan. 13, 2010.

Analysis engine 140 can select one or more of interaction object 148 through various techniques. In some embodiments, each interaction object 148 includes relevancy criteria constructed based on relevant media features. The relevancy criteria can be considered a set of requirements or optional conditions that should be satisfied to indicate that interaction object 148 could be associated with media content 135. The relevancy criteria can comprise one or more media feature values, possibly based on thresholds or ranges. Additionally, the relevancy criteria could represent pointers to known objects that are identified via media features 142 as discussed above. Analysis engine 140 can submit a query constructed from the media features to interaction database 146, or even to object database 144, to select interaction objects 148 that have relevancy criteria that would be satisfied based on the set of media features.

As an example, an interaction object 148 representing a purchase could comprise relevancy criteria defined in terms of a class of SIFT features that correlate to an item of clothing. For example, the class of SIFT features might be correlated with a shirt, blouse, tie, hat, pants, gloves, shoes, socks, fabric, pattern, or other item. The analysis engine 140 can then apply the SIFT algorithm to ingested media content 135 to identify the set of media features in media content 135. One should appreciate that the media features can be time dependent, especially in video, audio, or other time dependent modalities. Analysis engine 140 can then find the purchase-based interaction object 148 in interaction database 146 as long as the set of media features include SIFT features that are considered to fall within the class of SIFT features within the purchase object's relevancy criteria.

Interaction database 146 can return an interaction results set that includes one or more interaction objects 148 that can considered relevant to media content 135. Analysis engine 140 can use interaction object 148 to instantiate an actual instance of an interaction. For example, interaction object 148 could represent a template for possible interactions, say a commercial transaction. Analysis engine 140 can use information retrieved from media content 135, media features 142, or even object information from object database 144 to populate the template. Once the template is populated with relevant values, analysis engine 140 can create interaction instance 155. Interaction instance 155 represents a persistent computing structure as hosted by interaction engine 150 and is available to one or more devices 110.

One should appreciate that instance 155 can also include very specific recognition features. To continue the previous example of a purchasable item of clothing in media content 135, the purchase-based interaction object 148 has relevancy criteria defined in terms of a class of features. The corresponding interaction instance 155 can include actual media feature values (e.g., SIFT feature values) representative of an actual item, a pair of shoes for example, within media content 135. Thus, when the item is observed by a device via similar recognition algorithms, the device can interact directly with instance 155 rather than having to go through an intermediary step of recognizing the item first.

Although interaction instance 155 is illustrated as hosted on interaction engine 150, interaction instance 155 could be hosted by other devices in ecosystem 100 operating as interaction engine 150. For example, interaction instance 155 could be hosted by analysis engine 140, media interface 130, media portal 120, device 110, or other device configured to host interaction instances. Regardless of where interaction instance 155 is hosted, it becomes available to devices 110.

Device 110 represents a wide range of possible devices from consumer electronics to security systems. As an example, device 110 can include a sensor-enabled smart phone (e.g., iPhone®, Nexus®, Galaxy®, etc.). Additional types of devices can include vehicles, set top boxes, game consoles, media players, kiosks, appliances (e.g., televisions, stereos, etc.), or other suitably sensor-enabled electronic device. The user can direct their smart phone's sensors (e.g., cameras, microphone, etc.) toward a presentation of media content 135 via media portal 120. The user can then capture a digital representation, represented by the dashed line field of view, of media content 135. For example, the user could capture an image of a television program, a video of a billboard, an audio track of a live play, or other forms of digital representations.

Device 110 can send the digital representation to one or more recognition platforms, illustrated as interaction engine 150, which processes the digital representation to derive a second set of media features. The recognition platform can then compare the second set of media features using the same or similar algorithms used by analysis engine 140 to generate media features 142, which gave rise to interaction instance 155. If the recognition engine determines there is a match between the second set of media features, to within matching criteria, and those that gave rise to instance 155, then interaction instance 155 can be made available to device 110. Although the recognition platform is illustrated as a component of interaction engine 150, one should appreciate that the recognition platform can be located on device 110, on other devices in ecosystem 100, within a search engine, within a cloud-based infrastructure (e.g., Amazon EC, Google Cloud, Windows Azure, etc.), or even distributed among elements of ecosystem 100.

One will appreciate the value of the disclosed techniques. By decoupling device 110 from media portal 120 and media content 135, media providers realize numerous benefits. First and foremost, media providers are able to create fully interactive media via a "second screen" without requiring modification to their existing processes or infrastructure. Additionally, providers of media portals 120 (e.g., media players, cell phones, televisions, kiosks, etc.) do not have to modify the functionality of their systems to allow users to interact with presented media content 135. Second, the disclosed system allows for pre-recognition of content within media content 135, which reduces recognition requirements on device 110 or other elements in the system because possible instances of interactions are already made available without requiring further analysis other than detecting salient media features. Such an approach allows for tailoring or modifying interaction instances 155, possibly in real-time, for specific devices 110 or specific users.

Interaction engine 150 can take on many different forms. In some embodiments, interaction engine 150 comprises a publicly available search engine or knowledge base. For example, Google®, Yahoo!®, Bing® or other search services can be readily adapted to receive a digital representation of media content 135 from device 110 as a query. The digital representation could include raw data, processed data, or even the previously mentioned second set of media features. Interaction engine 150 could also offer its capabilities through a Uniform Resource Locator (URL), a web page, an Application Program Interface (API), a cloud-based service (e.g., platform-as-a-service, infrastructure-as-a-service, software-as-a-service, etc.), or other interfaces.

Figure 2:
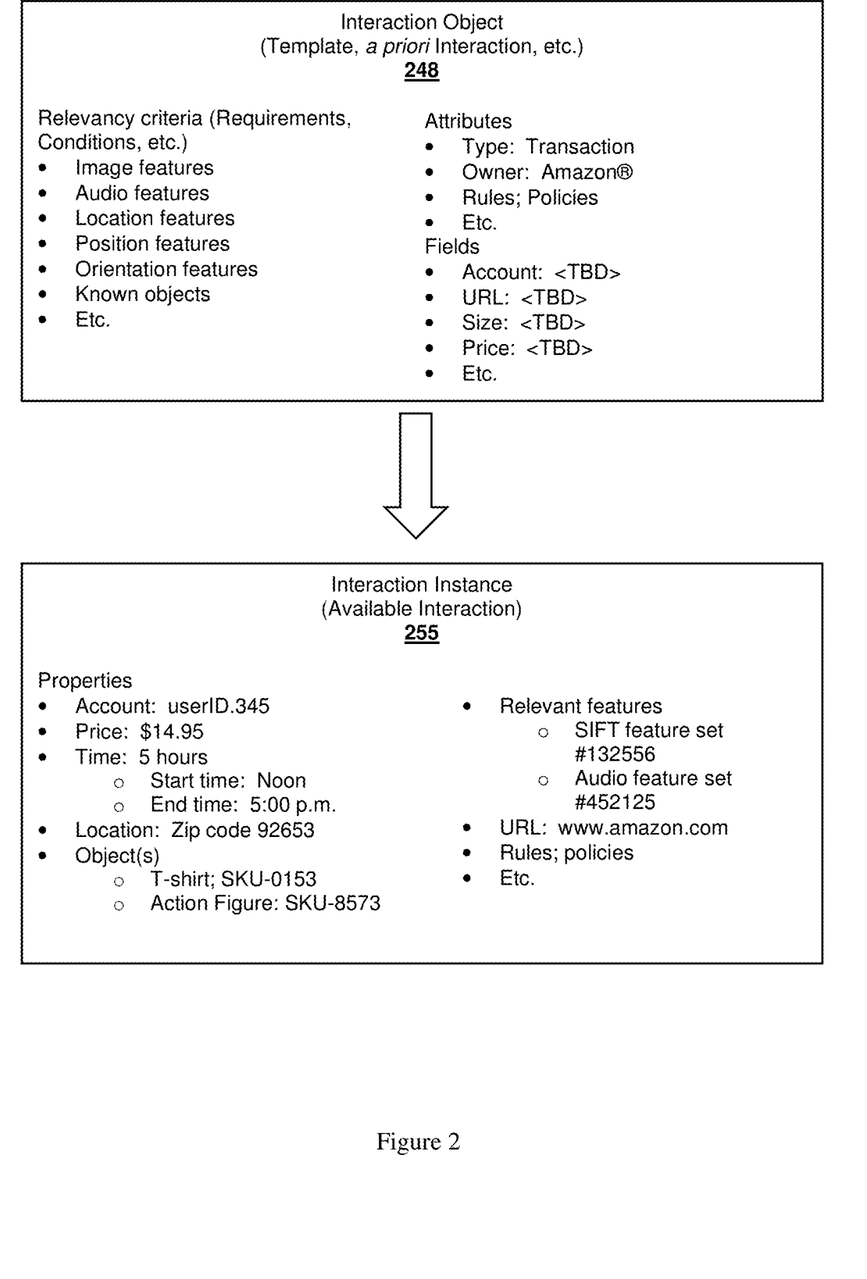
FIG. 2 illustrates instantiation of an interaction.

FIG. 2 provides additional clarity with respect to generating a persistent point of interaction. In the example shown, interaction object 248 is presented as a template for point of interaction. In this case, interaction object 248 represents a transaction that can be conducted with Amazon®. When an analysis engine determines that interaction object 248 is relevant to media content, the analysis engine can instantiate interaction instance 255 as an actual persistent and available interaction.

Interaction object 248 can be stored within an object database as a distinct manageable object. One should appreciate that interaction object 248 could be one of many thousands, or even millions, of possible points of interaction. One aspect of the inventive subject matter is considered to include management infrastructure configured to allow interaction managers to create, delete, modify, or otherwise manage interaction objects. For example, the disclosed system can include a management interface (e.g., web page, interaction server, etc.) configured to allow a manager to create new or custom versions of interaction object 248.

Interaction object 248 includes several features of note, including relevancy criteria by which an entity identifies interaction object 248 as being relevant. The relevancy criteria can be generated as a function of a media feature namespace. For example, the media features namespace can cover range of image features (e.g., scale invariant features, types of features, classes of features, etc.) that are derivable from image data. The relevancy criteria can then include one or more image-based criterion that depends on values within the image feature namespace. The relevancy criteria can include one or more dimensions of media derivable features including image features, audio features, recognition features, orientation features, metadata features, or other information. The relevancy criteria can also include logical connectors (e.g., AND, OR, XOR, NOT, NAND, etc.), rules, requirements, or optional conditions that bind the various feature values or criterion together as a cohesive whole.

As a specific example, consider image features derived from application of SIFT to image data or video data. In view the SIFT algorithm is known, resulting SIFT features as applied to an image can be mapped to one or more hash values via a hash function where the hash space can represent the namespace of image features. The relevancy criteria for interaction object 248 can then include criteria defined in terms of the hash space possibly based on a distance hash function (e.g., local similarity hash; Gionis et al., "Similarity Search in High Dimensions via Hashing", Proceedings of the $25^{th}$ VLDB Conference, Edinburg, Scotland, 1999).

The relevancy criteria can also depend on other factors beyond media features possibly as a function of device or user location data, position data, location data, user data, or other information. In some embodiments the relevancy criteria can also depend on known objects or types of objects. For example, when the analysis engine recognizes a specific type of object; a clothing item, a toy, a person, etc., the analysis engine can search the object database for interaction objects 248 that reference the type of object. Relevancy criteria that depend on objects can be based on object name, object classification, object make, object model, logo, symbol, OCRed text, labels, brand, or other features related to the object.

Interaction object 248 can also one or more attributes or other properties that aid in management of interaction object 248. Example attributes can include a type of interaction supported by interaction object 248, an owner, a publisher, API calls, network addresses where the point of interaction is to be hosted, transaction account information, or other types of object interaction. Such information can be quite useful when deploying actual instances of interaction object 248. In some scenarios, a person can create interaction object 248 and offer its capabilities to others in exchange for a fee. Thus, interaction object 248 might belong to its developer while the actual interaction instance 255 might support a third party interaction. When a user has an interaction via interaction instance 255, the attributes inherited from interaction object 248 can be used for accounting purposes. Upon interaction with interaction instance 255, the creator or owner of the interaction object can receive a payment from the entity hosting or providing interaction instance 255.

Interaction object 248 can also include one or more fields that can be populated when creating interaction instance 255. Once populated, the fields define a possible unique nature of an actual point of interaction as represented by interaction instance 255. Contemplated fields can include an instance identifier (e.g., UUID, GUID, hash, etc.), account information, specific network addresses where information can be located, prices or costs, product information (e.g., size, shape, color, inventory listing, etc.), relevant media features or values of media features, SKUs, time or location information applicable to the instance, or other information. Interaction instances 255 can be instantiated to interact with a signal electronic device or user, or multiple devices.

Interaction instance 255 represents a deployed point of interaction instantiated from interaction object 248. In this example, interaction instance 255 represents a transaction for a T-shirt or a toy action figure. Interaction instance 255 includes one or more properties that can be used to define nature of the interaction where properties can be inherited from interaction object 248 or can include populated fields. The fields can be populated based on information obtained from the media content, media features, media provider, interaction object 248, or other internal or external information sources.

The properties within interaction instance 255 include sufficient information to enable a user, via their electronic device (e.g., smart phone, tablet, electronic pen, etc.) to experience the interaction. The scope or breadth of the properties depends on the type of interaction. Transactions would likely include properties like price, account information, inventory information, fees, security keys, or other features. A search interaction might require an API or URL reference, or a pointer to a translation module (e.g., optical character recognition, speech to text, language to language, etc.). A gaming interaction might include user ID, game player account information, list of available commands, or other features.

Interaction instance 255 can also include relevant media features by which a user can find the point of interaction. When a user captures a digital representation of the media content, a recognition platform can analyze the digital representation to extract a set of media features. The extracted set of media features can then be used to search for active interaction instance 255.

One should appreciate that interaction instance 255 can comprise a transient point of interaction having limited extent in time or space. For example, interaction instance 255 can remain active or available based on a relative time or an absolute time. A relative time, can comprise a duration of time while an absolute time include specific reference to an actual point in time. The example illustrates a duration (i.e., five hours) and absolute time based on start and stop times. Such an approach is considered useful where media providers wish to have synchronized points of interactions with simultaneous presentation of their media content. Advertising or transaction-based interactions can be synchronized with a broadcast of a corresponding television or media event. The time properties can be based on minutes, hours, days, weeks, months, years, or other temporal values. The synchronization can include a time or location envelop around the actual broadcast to ensure the consumer has an acceptable experience, especially when broadcasts are delayed or not available in all areas.

The transient nature of interaction instance 255 can be based on geo-location as well. Instance 255 can be restricted to only those individuals at a location as determined by coordinates obtained from their electronic devices (e.g., GPS, triangulation, recognized scene, visual simultaneous localization and mapping (vSLAM), etc.). When an individual is in a proper location, they can experience the interaction. Such an approach allows for customizing interaction instance 255 based on location. For example, each zip code could point to a different network address where information can be obtained about the media content; perhaps a news source in an emergency.

Although interaction instance 255 is illustrated as a fleshed out listing of properties, some embodiments can include additional custom properties lacking values upon instantiation. The custom properties can be populated based on user or user device information. For example, a custom property could include a user's phone number that is populated upon the user device connecting with interaction instance 255. Providing custom properties allows for tailoring interaction instance 255 to specific devices, users, groups of users, locations, or other entities at the time of interaction.

An especially interesting property of interaction instance 255 includes one or more rules or policies that govern the behavior of the corresponding point of interaction. The rules can include commands or instructions on how the interaction should behave. With respect to transactions, the rules could include security protocols or standardized protocols to ensure the privacy or veracity of a transaction. The rules or policies can further include references or pointers to other interaction instances thereby allowing construction of a set of interrelated interactions that give rise to a desired experience. For example, a search interaction on a retailer web site could be coupled with purchasing interaction.

Interaction instance 255 can take on many different forms. In some embodiments, instance 255 can comprise a hosted service made available via a cloud-based system (e.g., Amazon EC2, etc.). In other embodiments, instance 255 can include one or more API calls that are made available to other application, possibly as part of a SaaS, IaaS, or PaaS system. Still, in other embodiments, instance 255 could comprise an actual web site, web page, or even a top level domain that is instantiated and made available. Yet another example includes constructing interaction instance 255 as an application, applet, or app targeting a user device. For example, a user might capture an image of actors playing a game on a television show. In response to recognizing the media features, an interaction engine determines that a game is available to the user. The interaction engine can instantiate a game or a game interface on the user's device in supporting of game play.

Configuring a device to support interactions according to interaction instance 255 depends on the nature of the type of interaction as discussed above. In more interesting embodiments, a user receives an indication that interactions are available or at least active. For example, a user can turn an active camera toward displayed media content of interest. A recognition engine automatically derives media features from the captured image data of the media content, determines availability of one or more of interaction instance 255, and can then superimpose markers or other indications on the field of view indicating availability of the interactions. The indications can include bounding boxes, object out lines, or indications where interactions might be present relative to a position or orientation of the user's device. Acceptable techniques that can be adapted for presenting indications that an interaction is available include U.S. Pat. No. 7,775,437 or those discussed in U.S. patent application publication 2001/0177969 to Huang et al. titled "Method and System for Image Processing to Classify an Object in an Image", filed Jan. 13, 2010.

One will appreciate that the inventive subject matter includes management of interaction object 248 or interaction instance 255 as valuable commodities. Thus, each of interaction object 248 can be leased, bought, auctioned, sold, transferred, licensed, or otherwise managed in exchange for a fee. For example, the disclosed analysis engine could also operate as a management interface through which individuals can offer the services of their interaction objects.

Figure 3:
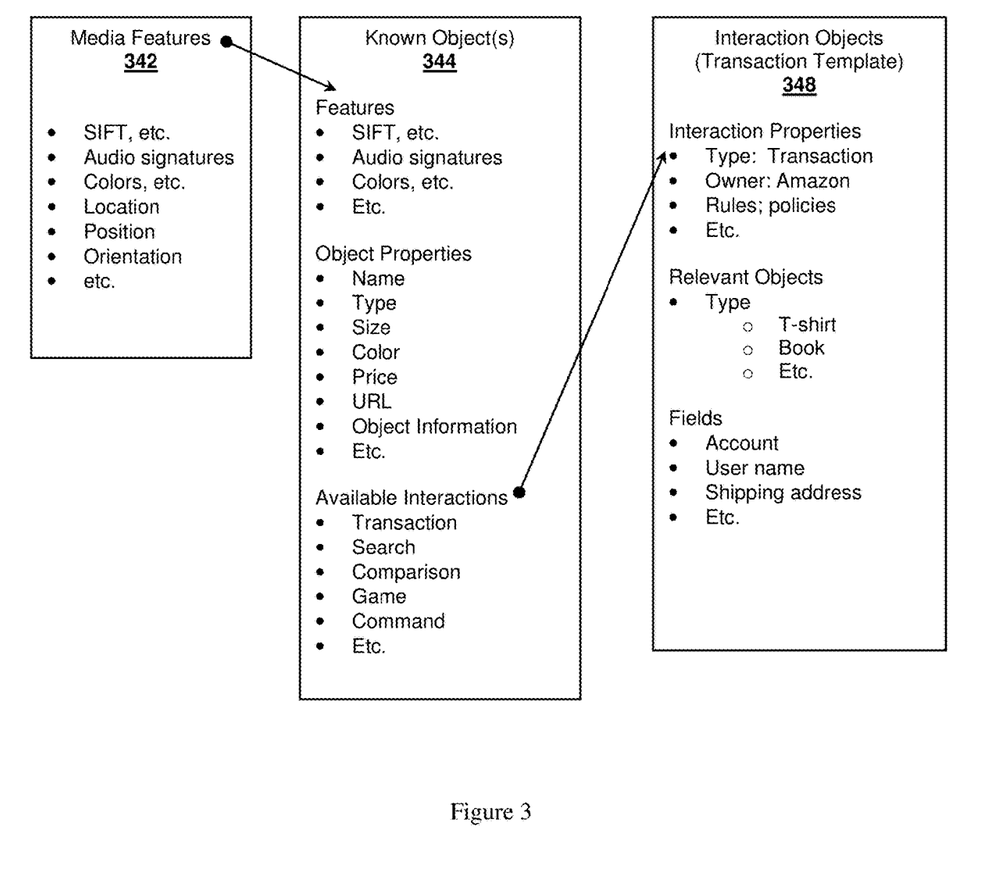
FIG. 3 illustrates a possible approach for mapping media features to interaction objects via one or more recognized objects.

FIG. 3 illustrates a possible indirect avenue through which an interaction analysis engine can determine if interaction objects would be relevant to media content through an intermediary linking entity. In the example, the analysis engine receives the media content and identifies one or more sets of media features 342 from the media content. As indicated media features 342 can include a broad spectrum of derivable features. The analysis engine can then use media features 342 to search a database of known object 344. When a match is found, the analysis engine can further obtain information related to known object 344 wherein the object information indicates which types of interactions could be considered relevant to objects within the media content. Known object 344 can reference which interactions are available by name, identifier, type, category, or other type of reference. Analysis engine can then use the known object 344 and its information to select one or more of interaction objects 348 where interaction object 348 has relevancy criteria satisfied by the known object 344 or media features 342. Once selected, the analysis engine can instantiate an actual instance of interaction object 348 by populating properties of interaction from the information objections from known object 344 or other source.

Although FIG. 3 illustrates one possible technique for an interaction analysis engine to identify relevant points of interactions for media content, one should appreciate that other techniques can also be used. As discussed previously, the analysis engine can select interaction object 348 directly based on media features. Further, interaction objects 348 can be filtered based on requirements from media provider or other entity wishing to employ the services of the analysis engine. Interaction objects 348 could be filtered based on fee, time, geo-location, media content, affiliations, demographics, or other attributes.

Figure 4:
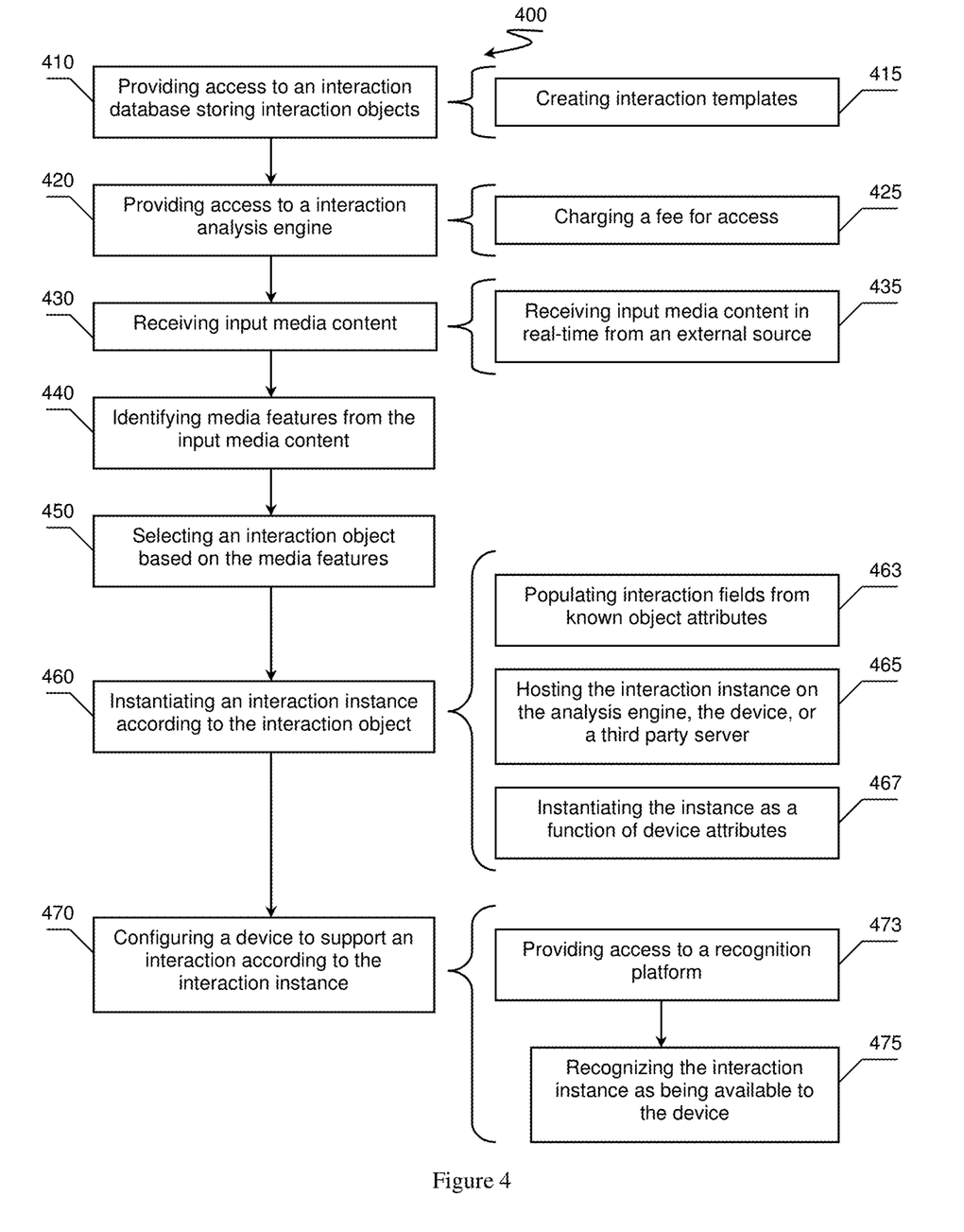
FIG. 4 is a schematic of a method for creating support for user interactions with media content.

FIG. 4 illustrates method 400 of generating one or more interaction points associated with media content as discussed above. Step 410 includes providing access to an interaction database storing interaction objects. In some embodiments, the interaction database, along with other elements of the system, can be accessed as a for-fee service through which media providers can establish interaction points for their media content. The interaction database can be hosted on a local server, a remote server, or as a virtual service hosted on a cloud infrastructure. Further, the interaction database can be accessed over a network, the Internet for example, or through a local network connection. In some embodiments, the interaction database can be incorporated within an interaction analysis engine. As discussed previously, the interaction database can be configured to store many interaction objects; possibly hundreds, thousands, millions or more interaction objects. The interaction objects can be stored according to schema that readily allows for retrieving the interaction objects, at least in part, based on a media feature namespace. For example, each interaction object can include relevancy criteria that is directly or indirectly related to media features. When a query constructed based on media features is submitted to the interaction database, the interaction database can return zero or more interaction objects having relevancy criteria satisfied by the media features as discussed further below.

Interaction objects can be created according to different techniques. In some embodiments, Step 415 can include creating one or more interaction objects as interaction templates. The templates can include NULL or blank property fields that can be populated when an actual interaction is created, this giving rise to an available instance of the interaction. Interaction templates allow the system to support many different classes or types of interactions including transaction (e.g., commercial, financial, computer protocol, etc.), searches, game interactions, chains of interactions, vote registration, likes or dislikes, social interactions, or other types of interactions.

Step 420 can include providing access to an interaction analysis engine, which can determine possible interaction points to be associated with the media content. As with the interaction database, the interaction analysis engine can be offered as a for-fee service. In some embodiments, the interaction analysis engine can comprise a computer server or other type of device configured to execute software instructions on one or more processors (e.g., single core, multi-core, gate arrays, etc.) to perform the techniques disclosed herein. For example, the analysis engine can include a web server configured to ingest media content by offering access to one or more exposed web service API. Users wishing to access the services offered by the interaction analysis can then access the API or other aspect of the engine once required fees, authentication, authorization, or other measures have been take.

In some embodiments, as indicated by step 425, the method can include charging a fee in exchange for access to the interaction analysis engine. Example fees can include a subscription fee, a licensing fee, a per use charge, a flat fee, a charge for number of uses, a bid, a complexity charge associated with the algorithms to be applied to the media content, a modality charge associated with the data modality to be process (e.g., image, audio, kinesthetic, etc.), or other types of charge. Some embodiments can also include using an auction to determine the fee where the auction could be for some form of exclusivity to gain access to desirable interactions. For example, media providers could participate within an auction to determine who could have access to interactions during time slots while television shows are presented in prime time.

Step 430 can include the analysis engine receiving media content as input possibly viewed on or more media input interfaces (e.g., a file, HTTP server, A/V port, television or radio tuner, media player, camera, microphone, sensors, etc.). In some embodiments, the analysis engine itself can actively pull the media content. For example, the analysis engine can obtain a real-time broadcast of the media content from an external source possibly via a television or radio tuner as suggested by Step 435. In other embodiments, the analysis engine can receive pushed content from an external source, possibly submitted through an API or a web interface (e.g., HTTP Post, FTP, Dropbox, etc.), or the analysis engine could simply read the media content from a locally stored file on a file system (e.g., JPG images, video files, local Dropbox folder, etc.).

Step 440 can include identifying a set of media features derived from the input media content. The media features can include algorithmically derived features from the media content data, where the set of media features can comprises one or more dimensions of relevance. For example, image data can be analyzed to derive data features related to image data using on algorithms based on SIFT, SURF, vSLAM, Binary Robust Invariant Scalable Keypoints (BRISK), facial recognition, local image descriptors, or other known or yet to be invented image or video analysis features. Further the set of media features can include features derived from audio data, kinesthetic data, or other modality. As discussed previously the set of media features can take on the form of a vector where each member of the vector aligns with a different dimension of relevance; by data modality, by algorithm, by time, by location, or other dimensions.

Step 450 includes selecting one or more interaction objects from the interaction object having relevancy criteria satisfied by at least a portion of the extracted set of media features. The analysis engine can construct a query based on the set of media features and submit the query to the interaction database. In response, the interaction database can construct a result set of one or more interaction objects responsive to the query. In some embodiments, the query can comprise actual elements from the set of media features or types of features found, especially where the interaction objects are stored in the interaction object database according to an indexing scheme based on a media feature namespace. In other embodiments, the query can be constructed through one or more intermediary entities. For example, the media features can be used to search for known objects in an object database having similar features. Thus, the system can be considered to "recognize" objects within the media content. Each stored known object can include references or pointers to relevant interaction objects within the interaction database. Such an approach is considered useful when interactions are to be bound to recognized objects within the media content.

The results set returned by the interaction database can comprise multiple interaction objects. In some embodiments, the result set can be ordered or ranked according to one or more metrics derived from the set of media features or other relevant information. For example, the interaction objects can be ordered according to a confidence level relating to how well the interaction object aligns with the set of media features, a time or location, a similarity hash value, or other metrics. Consider a scenario where a television show is to be aired where the television show has been a priori ingested by the interaction analysis engine. The result test of interaction objects can be ordered by time according to when each interaction object should be synchronized (i.e., made available) with elements or content of the television show. Other metrics can include user or media provider preferences, exclusivity applied to interaction object, cost of interaction objects, or other factors. Further, the result set can be ordered by a primary, secondary, tertiary, or higher sorting factors.

Step 460 can include instantiating an interaction instance according to at least one of the interaction objects within the results set. The interaction instance represents an actual point of interactions that can be activated or otherwise made available to users. The interaction instance can be considered a persistent point of interaction that is available when a user observes the media content. The instance can be created by populating properties of the relevant interacting objects so that the resulting instance can properly function. For example, in a financial transaction, the instance can include a source account identifier, a destination account identifier, security codes or passwords, a financial exchange protocol (e.g., FIX protocol, Secure Electronic Transaction, RFC 1898, etc.), or other required information.

The information to populate required properties can originate from one or more known objects. In embodiments that recognize known objects in the media content as an intermediary step to select an interaction object, the method can include populating interaction fields from attributes of the known object as indicated by Step 463. Consider a scenario where the media content includes a print ad for sporting shoes. The analysis engine ingests media content representative of the print add (e.g., a JPG image, a PDF file, etc.) and converts the image into media features (e.g., SIFT, SURF, BRISK, FAST, BRIEF, OCRed text, symbols, logos, etc.). The analysis engine recognizes the sporting shoes based on the media features and retrieves information about the shoes from the known object database. The retrieved information can then be used to populate the fields of the interaction instance. The interaction instance can then include the brand, cost, availability, location, or other information that might be related to the interaction.

The interaction instance can be hosted by one or more computing devices. Step 465 can include hosting interaction instance on the analysis engine for example, where the analysis engine operates as a recognition platform or even an interaction engine as discussed above. Further, step 465 can include hosting the interaction instance on a third party server, perhaps on the media provider's server or a social network server. Still further, step 465 can include hosting a user's device. For example, a cell phone carrier can provision smart phones with the interaction instances in preparation for airing of a television show so that consumer's smart phones are prepared for interacting with the television show.

In view that the interaction instance can be available to a vast numbers of devices or device types, Step 467 suggests that contemplated methods can include instantiating the interaction instance as a function of a target device's attributes. Such an approach is considered valuable because the interaction instances can be tailored to individuals so that the interaction instances can be more engaging. The interaction instances can be tailored based on time, geo-location (e.g., GPS coordinates, zip code, city, county, time zone, country, etc.), device type, device maker or model, device position (e.g., relative, absolute, etc.), device capabilities, device user, user preferences, or other characteristics. Thus, interaction instances can be restricted by time or location while also servicing specific needs of a user.

Step 470 can include configuring a device to support an interaction according to the interaction instance. The device, possibly a smart phone, can be pre-configured or post-configured. In embodiment supporting pre-configuration of the device, an interaction engine can transmit corresponding interaction instances to the device so that the device is configured just-in-time to support the interaction even before the device observes the media content. A post-configuration would represent a scenario where the device itself attempts to seek out the interaction instance based on its observation of the media content.

In some embodiments, Step 473 can include providing access to one or more recognition platforms configured to analyze digital representations of the media content and extract one or more sets of media features. The recognition platform can take on many different forms. In some embodiments the recognition platform can be disposed within the electronic device (e.g., a user's cell phone, game console, a kiosk, etc.). In other embodiments, the recognition platform can operate as part of the interaction action or possibly as part of a public search engine facility.

Regardless of the form of the recognition platform, Step 475 can include the recognition platform recognizing one or more interaction instances as being available to the device. For example, the recognition platform can use the newly derived set of media features as a query to the interaction engine. In response, the interaction engine can generate a results set comprising available interaction instances, or references to the interaction instances, having similar media features. Thus, the recognition platform directly "recognizes" available interactions without having to go through an intermediary lookup of recognized objects within the media content. The result set can be ordered or ranked according to one or more metrics. For example, the interaction instances having relevant media features that most closely align with the set of media features can be ranked higher. Still, in other scenarios the interaction instances can be ordered according to a time in which they would become available.

The disclosed techniques give rise to a number of interesting advantages. As discussed previously, the inventive subject matter can be applied to an interactive television show. Television shows can be ingested by an interaction analysis engine before airing or even while the show is airing. The analysis engine can establish points of interaction associated with the television show. Interactions can include purchasing items in the show, requesting advertiser information, sending or receiving content associated with the show, participating in a social network experience, searching for items associated with the show, playing games (e.g., trivia, game show, etc.), or other types of interactions. Television show creators or networks can now create a broad spectrum of second screen interactions without having to modify their content or modify a user's cell phone.

Construction of interaction analysis engines allow for a priori analysis of media content without limitations of annotation authoring tools. Rather than having a human operator determining which components of media content should have interactions, which is time consuming and expensive, the analysis engine can readily process the media content quickly. Analysis engine can "view" the media content at an accelerated pace relative to what can be achieved by a human. For example, the analysis engine can process the raw media content as fast at the processor bandwidth allows, assuming the engine is not I/O bound. Such an approach allows for volume production of interactive media content. A service (e.g., PaaS, IaaS, SaaS, etc.) can ingest dozens, hundreds, thousands, or more media feeds at the same time regardless of their digital format. To be clear, the analysis engine is able to process feeds faster than the feed is intended to be viewed by a human.

Contemplated systems can also process media feeds in parallel. For example, video media content can include multiple channels; a video channel and an audio channel for example. Each channel related to the media content can be analyzed in parallel, synchronously, or even serially depending on available bandwidth. Other types of media content can have many different channels. Consider media content related to a game. The game media content can include video, image, metadata, audio, chat, advertising, or other channels. All of which can be analyzed for possible points of interaction.

Some embodiments operate in substantially real-time relative to a live broadcast. For example, media content reflecting a sporting event can be processed as the media content is broadcast. As the interaction analysis engine "watches" the broadcast via a suitable receiver or tuner, it determines which points of interaction could be instantiated in support of the broadcast. Perhaps the live broadcast comprises includes video of a basketball player; Kobe Bryant for example. The analysis engine can create interaction instances including construction of a search for sports statistics, advertisements for the Lakers®, or purchasing endorsed sports paraphernalia. Such an approach represents construction of a just-in-time interaction.

Yet another example includes providing virtual shopping experiences. Vendors or retailers can provide images of their products to the analysis engine. The analysis engine can pre-configure devices with purchasing interactions annotated by relevant media features. The vendors can present images of their products via posters, billboards, media screens, kiosks, or other presentation techniques. A consumer need only capture an image of a product of interest and their device, a cell phone for example, can "on-click" purchase the product. One should appreciate that such an approach lacks a requirement for use of bar codes, QR codes, codes in general, or actual product recognition. Further, this approach is considered superior to the approached offered by companies such as Tesco® where consumers image QR codes of products and require dedicated apps. Rather, the disclosed approach efficiently binds the derivable media features directly to instantiated interactions.

Still further, the disclosed techniques give rise to a rich world of multimodal multi-screen interactions. The examples presented within this disclosure so far discusses interactions with a single device interaction. However, the inventive subject matter is considered to include instantiating one or more interaction objects that are accessible by multiple devices, which allows a user to experience the interactions from many different perspectives. For example, a user can capture an image of a magazine cover or a television program, and interact with instantiated interaction objects via their cell phone, tablet, television, printer, and game console all at the same time. Each device can provide a different modality of interaction (e.g., the printer provides hard copy, the game console provide virtual reality, the phone provide audio, etc.) or simply different augmented content related to the media content.

Specific embodiments include interacting with televisions or other screen-based platforms (e.g., kiosk, third party tablets or cell phones, electronic billboards, movie screens, etc.) or with static images (e.g., paintings, posters, magazines, etc.). Media content for each type of venue can be processed before or after distribution as desired. Once processed, corresponding instantiated interactions can be made available to consumers via the screen-based platforms or image displays.

A particularly interesting embodiment includes using the disclosed techniques for interacting with the real-world in a virtual fashion. The reader might be aware of information services offer through various forms of Wikis (see URL en.wikipedia.org/wiki/Wiki), an interactive type of web site developed by Ward Cunningham in the mid 1990s. Wikis allow users to annotate or update web content; Wikipedia being the most famous example. The disclosed techniques allow user to annotate or update real-world objects. For example, the disclosed elements of the interactive system can be disposed within a camera-enabled computing device; a smart phone, tablet, VR or AR glasses, or other device. The user can capture an image of a real-world object, or other sensor data for that matter, and then bind the media features derived from the sensor data to an interaction instance, perhaps a message or a game object. The interaction instance can be stored within the computing device or uploaded to a server (e.g., interaction engine, search engine, etc.). The next time the user, or other person, captures sensor data of the real-world object, and their device can recognize an opportunity for interaction with the object through similarly derived media features. The device itself or a service can then offer access to the interaction instance. Such embodiments allow users to annotate the world with virtual content as a Virtual World Wiki (VWW), or create games where real-world objects become virtual game elements. The advantage of such an approach is computing devices no longer have to work through an intermediary step of recognizing an object because media features can be bound directly to an interaction instance.

Such multimodal interactions are advantageous on numerous fronts. For the blind or hearing impaired, interaction objects can be instantiated according to their specific needs. A transaction interaction object can be instantiated for a blind according to an audio format while the same transaction interaction object can be instantiated for a hearing impaired person according to a visual format. Additionally, one or more instantiated interaction objects can be bound to a user or other entity rather than just a specific device. Such an approach increases the immersive experience of a user by allowing the user to experience the interactions via any device to which they have access. Thus a user can trigger access to an instantiated object, possibly an extended instance such as a game, and access the instantiated object (or objects) via browsers, cell phones, game consoles, or other devices that are at hand.

Interaction objects can be instantiated in a highly personalized fashion. The instantiated interaction objects can be customized according to many different factors including location of the user, time of interaction, personal preferences, device capabilities, user capabilities (e.g., disabilities, skills, education, etc.), or other factors. For example, the interaction engine can monitor or track trends in a user's interactions. As the user interacts with instantiated interaction objects, the engine can determine that the user is becoming more sophisticated with respect to the interactions. In response, the interaction engine can provide access to additional advanced options to the interaction instance. Thus, the instantiated interaction instances can created based on historical user behavior.

In view that the disclosed system gives to multimodal interactions based on multimodal media content, an apt metaphor for the disclosed techniques in one of the human senses. The human senses aggregate modalities of data (e.g., sensor data, media features, etc.), provide for generating a decision point (e.g., instantiating interaction objects), and interacting with the world based on the decision point (e.g., interacting with the instantiated interaction object). Consider human vision where a camera operates similar to the human eye. The camera captures visual information, which in turn is processed to create image-based features (e.g., colors, motion, etc.) possibly based on SIFT algorithms. Based on the derived image features, a person has an option of interacting with available interactions. The similarity to the human brain is clear in that interactions with the environment become apparent to the viewer. Similar parallels can be made with respect to human hearing, touch, taste, smell, or other aspects of the human experience.

Interestingly, the disclosed techniques provide for extending the human experience. As individuals interact with and observe media content with their devices, the resulting instantiated interaction objects can be placed, arranged, or curated according to many different factors. As discussed previously, the interaction instances can be metaphorically placed at any location (e.g., GPS coordinates, zip code, address, geo-fence, etc.) so that when the individual finds themselves in the location, they experience the available interactions. In a very real way, the disclose systems give rise to interaction points that individuals can interact with as they sense the world via their devices. The interaction points can be considered as recognizable objects based on the sensed multimodal sensed media features.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An interaction analysis system comprising:
   one or more processors;
   an interaction database storing interaction objects, each interaction object comprising selection criteria defined based on at least one of a device location and a digital attribute related to one or more media features of a media content; and
   at least one non-transitory tangible computer readable memory storing software instructions that, when executed by the one or more processors, cause the one or more processors to:
      identify the device location of a first mobile device and a first set of digital attributes based on at least one digital representation captured by the first mobile device;
      determine at least one interaction object having the selection criteria satisfied by the device location of the first mobile device and the first set of digital attributes;
      instantiate a first interaction instance in the at least one memory according to the at least one interaction object, wherein the first interaction instance comprises an application, applet, or app to instantiate a game interface in support of game play, and is customized for interacting with a user of the first mobile device according to one or more user capabilities, user preferences, historical user behavior, or a time of a gaming interaction;
      activate the first interaction instance by making the game interface of the first interaction instance available to a first user via the first mobile device upon satisfaction of activation criteria defined based on at least one of the device location of the first mobile device and the first set of digital attributes, wherein the first interaction instance is activated based at least in part on user data of the first user and accesses at least one additional option of the first interaction instance based on a previous or current gaming interaction of the first user with at least one instantiated interaction object;
      and
      receive user input from the first user causing the first mobile device to execute a first gaming interaction corresponding to the first interaction instance, the set of digital attributes, and the at least one digital representation wherein one or more media features derived from the at least one digital representation are associated with one or more real-world objects and stored with the at least one interaction object in the interaction database, and the at least one interaction object is accessible by a second mobile device executing a second gaming interaction corresponding to a second interaction instance comprising an application, applet, or app to instantiate a game interface in support of game play, and operable to communicate with the first interaction instance, wherein the game interface of the second interaction instance is customized for interacting with a user of the second mobile device according to one or more user capabilities, historical user behavior, user preferences, or a time of a gaming interaction and is activated based on the satisfaction of activation criteria defined based on at least one of the device location of the second mobile device and a second set of digital attributes based on at least one digital representation captured by the second mobile device.

2. The system of claim 1, wherein the at least one interaction object comprises a game play object.

3. The system of claim 1, wherein the selection criteria are defined based on both the device location and at least one digital attribute related to the media content.

4. The system of claim 1, wherein the first mobile device comprises at least one of a smart phone, and tablet.

5. The system of claim 1, wherein the user data includes a user location.

6. The system of claim 1, wherein the selection criteria are further defined based on digital attribute values, the digital attribute values including at least one threshold range.

7. The system of claim 1, wherein the digital attribute based on the at least one digital representation includes one or more environmental factors.

8. The system of claim 1, wherein the at least one digital representation is obtained from a device camera.

9. The system of claim 1, wherein the at least one interaction object maps to real-world objects that are virtual game elements.

10. The system of claim 1, wherein the first mobile device comprises a recognition platform.

11. The system of claim 10, wherein the set of digital attributes is derived from one or more recognition algorithms executed on the at least one digital representation captured by the first mobile device by the recognition platform.

12. The system of claim 11, wherein the set of digital attributes includes edges detected, via edge detection, from physical objects represented in the at least one digital representation captured by the first mobile device.

13. The system of claim 1, wherein at least one of the digital attributes from the set of digital attributes depends on a time.

14. The system of claim 13, wherein the at least one of the digital attributes depends on a specified time.

15. The system of claim 14, wherein the specified time comprises a relative time.

16. The system of claim 1, wherein the selection criteria are further defined based on a device orientation.

17. A method for instantiating an interaction object, comprising:
   identifying a device location of a first mobile device and a first set of digital attributes based on at least one digital representation captured by the first mobile device;
   determining at least one interaction object in an interaction database storing interaction objects, each interaction object comprising selection criteria defined based on at least one of a device location and a digital attribute related to one or more media features of a media content, the at least one interaction object having the selection criteria satisfied by the device location of the first mobile device and the first set of digital attributes;
   instantiating a first interaction instance in at least one memory according to the at least one interaction object, wherein the first interaction instance comprises an application, applet, or app to instantiate a game interface in support of game play, and is customized for interacting with a user of the first mobile device according to one or more user capabilities, user preferences, historical user behavior, or a time of a gaming interaction;

activating the first interaction instance by making the game interface of the first interaction instance available to a first user via the first mobile device upon satisfaction of activation criteria defined based on at least one of the device location of the first mobile device and the first set of digital attributes, wherein the first interaction instance is activated based at least in part on user data of the first user and accesses at least one additional option of the first interaction instance based on a previous or current gaming interaction of the first user with at least one instantiated interaction object; and receiving user input from the first user causing the first mobile device to execute a first gaming interaction corresponding to the first interaction instance, the first set of digital attributes, and the at least one digital representation wherein one or more media features derived from the at least one digital representation are associated with one or more real-world objects and are stored with the at least one interaction object in the interaction database, and the at least one interaction object is accessible by a second mobile device executing a second gaming interaction corresponding to a second interaction instance comprising an application, applet, or app to instantiate a game interface in support of game play, and operable to communicate with the first interaction instance, wherein the game interface of the second interaction instance is customized for interacting with a user of the second mobile device according to one or more user capabilities, user preferences, a time of a gaming interaction, or historical user behavior and is activated based on the satisfaction of activation criteria defined based on at least one of the device location of the second mobile device and a second set of digital attributes based on at least one digital representation captured by the second mobile device.

18. The method of claim 17, wherein the at least one interaction object comprises a game play object.

19. The method of claim 17, wherein the selection criteria are defined based on both the device location and the at least one digital attribute related to the media content.

20. The method of claim 17, wherein the first mobile device comprises at least one of a smart phone, and tablet.

21. The method of claim 17, wherein the user data includes a user location.

22. The method of claim 17, wherein the selection criteria are further defined based on digital attribute values, the digital attribute values including at least one threshold range.

23. The method of claim 17, wherein the digital attribute based on the at least one digital representation includes one or more environmental factors.

24. The method of claim 17, wherein the at least one digital representation is obtained from a device camera.

25. The method of claim 17, wherein the at least one interaction object maps to real-world objects that are virtual game elements.

26. The method of claim 17, wherein the first mobile device comprises a recognition platform.

27. The method of claim 26, wherein the set of digital attributes are derived from one or more recognition algorithms executed on the at least one digital representation by the recognition platform.

28. The method of claim 27, wherein the set of digital attributes includes edges detected, via edge detection, from physical objects represented in the at least one digital representation.

29. The method of claim 17, wherein at least one of the digital attributes from the set of digital attributes depends on a time.

30. The method of claim 29, wherein the at least one of the digital attributes depends on a specified time.

31. The method of claim 30, wherein the specified time comprises a relative time.

32. The method of claim 17, wherein the selection criteria are further defined based on a device orientation.

33. A non-transitory tangible computer readable medium storing one or more software instructions that, when executed by one or more processors, cause the one or more processors to:

identify a device location of a first mobile device and a first set of digital attributes based on at least one digital representation captured by the first mobile device;

determine at least one interaction object in an interaction database storing interaction objects, each interaction object comprising selection criteria defined based on at least one of a device location and a digital attribute related to one or more media features of a media content, the at least one interaction object having the selection criteria satisfied by the device location of the first mobile device and the first set of digital attributes;

instantiate a first interaction instance in at least one memory according to the at least one interaction object, wherein the first interaction instance comprises an application, applet, or app to instantiate a game interface in support of game play, and is customized for interacting with a user of the first mobile device according to one or more user capabilities, user preferences, historical user behavior, or a time of a gaming interaction;

activate the first interaction instance by making the game interface of the first interaction instance available to a first user via the first mobile device upon satisfaction of activation criteria defined based on at least one of the device location of the first mobile device and the first set of digital attributes, wherein the first interaction instance is activated based at least in part on user data of the first user and accesses at least one additional option of the first interaction instance based on a previous or current gaming interaction of the first user with at least one instantiated interaction object; and receive the user input from the first user causing the first mobile device to execute a first gaming interaction corresponding to the first interaction instance, the first set of digital attributes, and the at least one digital representation wherein one or more media features derived from the at least one digital representation are associated with one or more real-world objects and are stored with the at least one interaction object in the interaction database, and the at least one interaction object is accessible by a second mobile device executing a second gaming interaction corresponding to a second interaction instance comprising an application, applet, or app to instantiate a game interface in support of game play, and operable to communicate with the first interaction instance, wherein the game interface of the second interaction instance is customized for interacting with a user of the second mobile device according to one or more user capabilities, user preferences, a time of a gaming interaction, or historical user behavior and is activated based on the satisfaction of activation criteria defined based on at least one of the device location of the second mobile device and a second set of digital attributes based on at least one digital representation captured by the second mobile device.

34. The non-transitory tangible computer readable medium of claim 33, wherein if a plurality of interaction objects is determined, the plurality of interaction objects is ordered according to a confidence level relating to how the at least one interaction object aligns with at least one of the set of digital attributes, a time, or the device location.

35. The method of claim 17, wherein if a plurality of interaction objects is determined, the plurality of interaction objects is ordered according to a confidence level relating to how the at least one interaction object aligns with at least one of the set of digital attributes, a time, or the device location.

36. The interaction analysis system of claim 1, wherein if a plurality of interaction objects is determined, the plurality of interaction objects is ordered according to a confidence level relating to how the at least one interaction object aligns with at least one of the set of digital attributes, a time, or the device location.

* * * * *